(12) United States Patent
Wong et al.

(10) Patent No.: US 7,876,512 B2
(45) Date of Patent: Jan. 25, 2011

(54) APPARATUS FOR ASSEMBLING LENS MODULE

(75) Inventors: Hang-Ming Wong, Taipei Hsien (TW); Chun-Kai Wang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 263 days.

(21) Appl. No.: 12/242,534

(22) Filed: Sep. 30, 2008

(65) Prior Publication Data

US 2009/0128929 A1 May 21, 2009

(30) Foreign Application Priority Data

Nov. 19, 2007 (CN) .................... 2007 1 0202585

(51) Int. Cl.
*G02B 7/02* (2006.01)
(52) U.S. Cl. .................... 359/818; 359/811; 359/819
(58) Field of Classification Search .................. 359/818
See application file for complete search history.

(56) References Cited

U.S. PATENT DOCUMENTS

| | | | | |
|---|---|---|---|---|
| 5,127,692 | A * | 7/1992 | Yakou et al. .................... 294/2 |
| 5,576,895 | A * | 11/1996 | Ikeda .......................... 359/811 |
| 6,791,766 | B2 * | 9/2004 | Nishikawa ................... 359/811 |
| 7,236,316 | B2 * | 6/2007 | Miki ........................... 359/819 |
| 7,423,824 | B2 * | 9/2008 | Yamashita et al. ........... 359/824 |
| 2005/0231819 | A1 * | 10/2005 | Kao et al. .................... 359/683 |
| 2006/0007564 | A1 * | 1/2006 | Sakamoto et al. ............ 359/819 |
| 2006/0139776 | A1 * | 6/2006 | Mori ............................ 359/819 |
| 2007/0121222 | A1 * | 5/2007 | Watanabe ..................... 359/811 |

* cited by examiner

*Primary Examiner*—Jessica T Stultz
(74) *Attorney, Agent, or Firm*—Andrew C. Cheng

(57) ABSTRACT

An apparatus for assembling a lens module is provided. The lens module comprises a lens barrel and at least one optical element received therein. The apparatus includes an element-grasping member, an assembly station and two guiding members. The element-grasping member is configured for grasping the at least one optical element and mounting the at least one optical element into the lens barrel. The assembly station has a support surface. Each of the two guiding members includes a stationary element fixedly positioned on the support surface, a movable element and an elastic element. The movable element includes a positioning surface and a clamping surface. The positioning surface is configured for pressing the element-grasping member. The clamping surface is configured for pressing the lens barrel. The elastic element is positioned between the stationary element and the movable element.

14 Claims, 3 Drawing Sheets

APPARATUS FOR ASSEMBLING LENS MODULE

BACKGROUND

1. Field of the Invention

The present invention relates to apparatuses for assembling lens modules.

2. Description of Related Art

The ongoing development in microcircuitry and multimedia technology has made digital cameras popular and put into widespread use. High-end portable electronic devices, such as mobile phones and personal digital assistants (PDAs), are being developed to be increasingly multi-functional. Nowadays, some of these portable electronic devices are equipped with a camera module.

The camera module generally includes a lens module, which includes a lens barrel and a plurality of optical elements mounted in the lens barrel. The optical elements may for example include lenses, spacers, and an infrared-cut (IR-cut) filter.

A typical method for assembling the lens module includes securing a lens barrel on an assembly station, grasping an optical element, and mounting the optical element into the lens barrel, one by one with an optical element grasping member. The optical element-grasping member, the lens barrel, and the optical elements must be coaxial. If the optical element-grasping member is not coaxial with the lens barrel when mounting the optical elements, eccentricity may occur between the optical elements and the lens barrel, thereby adversely affecting the optical performance of the lens module.

Therefore, an improved apparatus for assembling lens modules is desired to overcome the above-described deficiencies.

SUMMARY

An apparatus for assembling a lens module is provided. The lens module comprises a lens barrel and at least one optical element received therein. The apparatus includes an element-grasping member, an assembly station and two guiding members. The element-grasping member is configured for grasping the at least one optical element and mounting the at least one optical element into the lens barrel. The assembly station has a support surface. Each of the two guiding members includes a stationary element fixedly positioned on the support surface, a movable element and an elastic element. The movable element includes a positioning surface and a clamping surface. The positioning surface is configured for pressing the element-grasping member. The clamping surface is configured for pressing the lens barrel. The elastic element is positioned between the stationary element and the movable element.

Other advantages and novel features will become more apparent from the following detailed description of the present apparatus for assembling lens modules, when taken in conjunction with the accompanying drawings.

BRIEF DESCRIPTION OF THE DRAWINGS

Many aspects of the present apparatus for assembling a lens module can be better understood with reference to the following drawings. The components in the drawings are not necessarily drawn to scale, the emphasis instead being placed upon clearly illustrating the principles of the present apparatus for assembling a lens module. Moreover, in the drawings, like reference numerals designate corresponding parts throughout the several views.

DETAILED DESCRIPTION OF THE EMBODIMENTS

Reference will now be made to the drawings to describe exemplary and preferred embodiments of the present apparatus for assembling a lens module.

Figure 1:
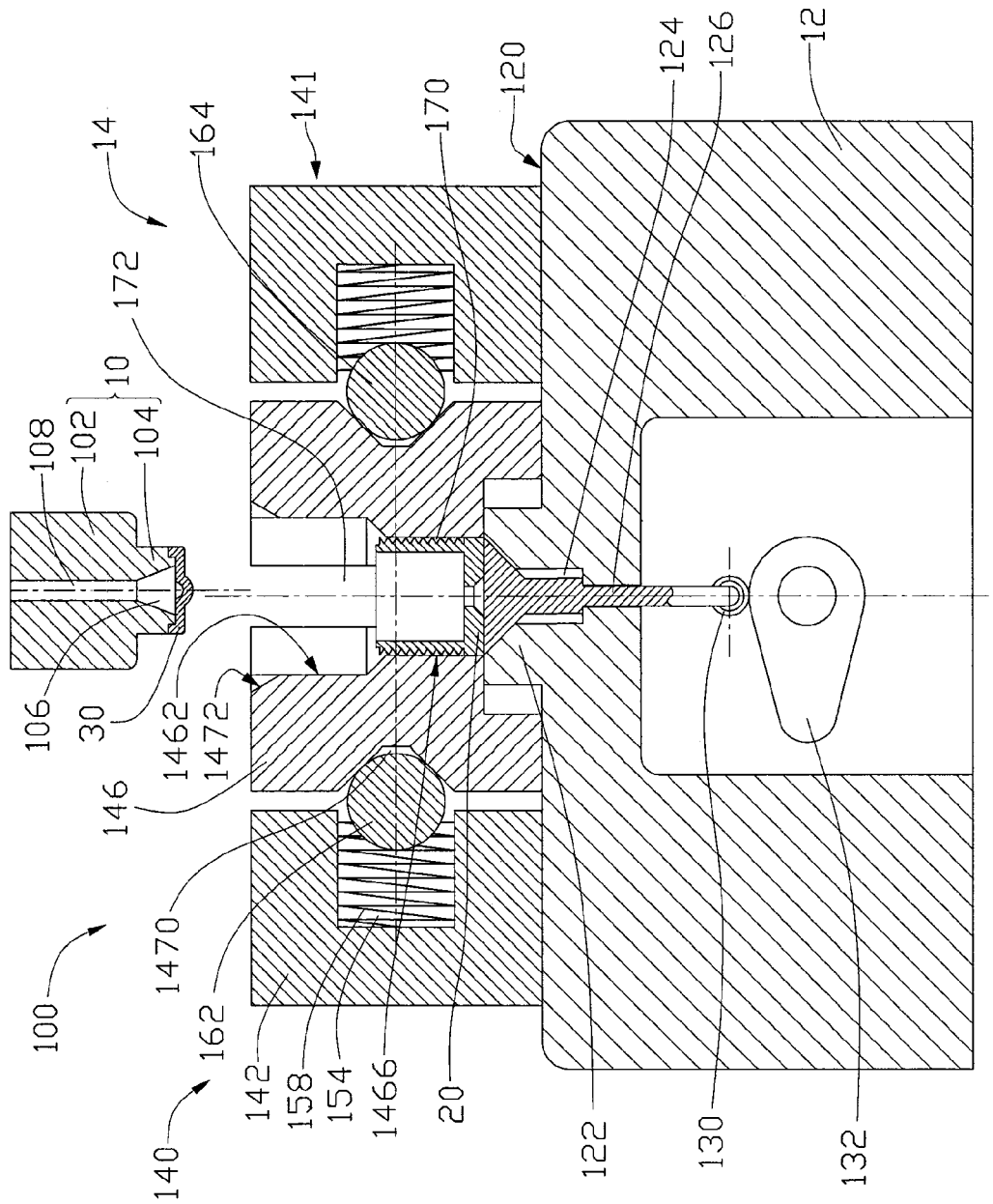
FIG. 1 is schematic, sectional view of an embodiment of an apparatus for assembling a lens module.

Referring to FIG. 1, an apparatus 100 for assembling a lens module includes an element-grasping member 10, an assembly station 12, and a guiding member 14. The lens module is a semi-finished product, and includes a lens barrel 20 and at least one optical element 30.

The element-grasping member 10 is configured for grasping the optical element 30 and mounting the optical element 30 into the lens barrel 20. The element-grasping member 10 may be a suction nozzle or a manipulator.

In the illustrated embodiment, the element-grasping member 10 is a suction nozzle 10 and the optical element 30 is a lens 30. The suction nozzle 10 includes a main body 102 and a grasping body 104 at a distal end of the main body 102. The principal axis of the main body 102 and the principal axis of the grasping body 104 are coaxial. The main body 102 and the grasping body 104 are generally columnar. An external diameter of the main body 102 is larger than an external diameter of the grasping body 104. A suction mouth 106 is defined at a distal end of the grasping body 104, and an elongate cavity 108 is defined in the main body 102 and the grasping body 104 cooperatively. One end of the elongate cavity 108 is in communication with the suction mouth 106 and the other end of the elongate cavity 108 is in communication with a vacuum pump (not shown). The vacuum pump is configured for creating a suction force in the elongate cavity 108 and the suction mouth 106, thereby causing the suction nozzle 10 to hold the lens 30.

The assembly station 12 has a support surface 120 configured for supporting the lens barrel 20 and the guiding member 14. A protrusion stage 122 protrudes from the support surface 120 and is integrally connected with the assembly station 12. A through hole 124 is defined on the support surface 120 and extends through the protrusion stage 122 and the assembly station 12. An eject-rod 126 is received in the through hole 124. An end of the eject-rod 126 is configured for supporting the lens barrel 20, and an opposite end of the eject-rod 126 is connected to a rotatable wheel 130. The rotatable wheel 130 sits on a rotary cam 132. The rotatable wheel 130 rotates by the rotation of the rotary cam 132 so that the eject-rod 126 moves along an extending direction of the through hole 124.

The guiding member 14 includes a first guiding member half 140 and a second guiding member half 141 opposite to the first guiding member half 140. The second guiding member half 141 is substantially the same as the first guiding member half 140. The first guiding member half 140 includes a stationary element 142 and a movable element 146.

The movable element 146 is disposed between the stationary element 142 and the protrusion stage 122. In one embodiment, the stationary element 142 is removably fixed to the support surface 120, for example, by screws or adhesive. In another embodiment, the stationary element 142 is integrally formed with the support surface 120.

The stationary element 142 defines a receiving recess 154 facing towards the movable element 146. An elastic element 158 is received in the receiving recess 154. The elastic element 158 is typically a spring used to provide a force in a direction opposite to its compression vector, such as a conical spring or a single-leaf spring. In the illustrated embodiment, the first elastic element 158 is a compression spring. An end of the elastic element 158 connects with the first stationary element 142 at the bottom of the receiving recess 154 and an opposite end of the elastic element 158 is fixed with an urging element 162. In the illustrated embodiment, the urging element 162 is sphere-shaped. In another embodiment, the first elastic element 158 is fixed to a side surface of the stationary element 142 without the receiving recess 154 defined therein.

The movable element 146 defines a blocking recess 1470 on a side surface facing towards the receiving recess 154. The blocking recess 1470 is configured for receiving the urging element 162. In the illustrated embodiment, the blocking recess 1470 has a shape of a frustum or a cone to prevent the urging element 162 from sliding in a direction different than the direction of the restoring force of the elastic element 158. In one embodiment, the urging element 162 is adhered to the inner wall of the blocking recess 1470.

The movable element 146 includes a guiding surface 1472, a positioning surface 1462, and a clamping surface 1466. The guiding surface 1472, the positioning surface 1462 and the clamping surface 1466 face away from the blocking recess 1470.

The positioning surface 1462 has a U-shaped surface with a constant radius of curvature and a principal axis substantially perpendicular to the support surface 120 of the assembly station 12. The radius of curvature of the positioning surface 1462 is equal to a radius of the outer surface of the main body 102. An angle of circumference of the positioning surface 1462 is no more than 180 degrees. The guiding surface 1472 is adjacent to the positioning surface 1462 and faces away from the protrusion stage 122. In the illustrated embodiment, the guiding surface 1472 is frustoconical-shaped. The principal axis of the guiding surface 1472 is substantially coaxial with the principal axis of the first positioning surface 1462.

The clamping surface 1466 is adjacent to the positioning surface 1462. In the illustrated embodiment, the clamping surface 1466 protrudes with respect to the positioning surface 1462. The clamping surface 1466 is U-shaped with a constant radius of curvature and a principal axis substantially coaxial with the positioning surface 1462. The radius of curvature of the clamping surface 1466 is equal to a radius of the lens barrel 20. The first clamping surface 1466 is configured for contacting the outer surface of the lens barrel 20. In another embodiment, the lens barrel 20 can also be disposed on the support surface 120 of the assembly station 12 directly.

The clamping surfaces 1466 of the first and second guiding members 140, 141 cooperatively define a first receiving space 170 for receiving the lens barrel 20. The positioning surfaces 1462 of the first and second guiding members 140, 141 cooperatively define a second receiving space 172 for receiving the main body 102 of the element-grasping member 10. The principal axis of the first receiving space 170 is substantially coaxial with the principal axis of the second receiving space 172.

Figure 2:
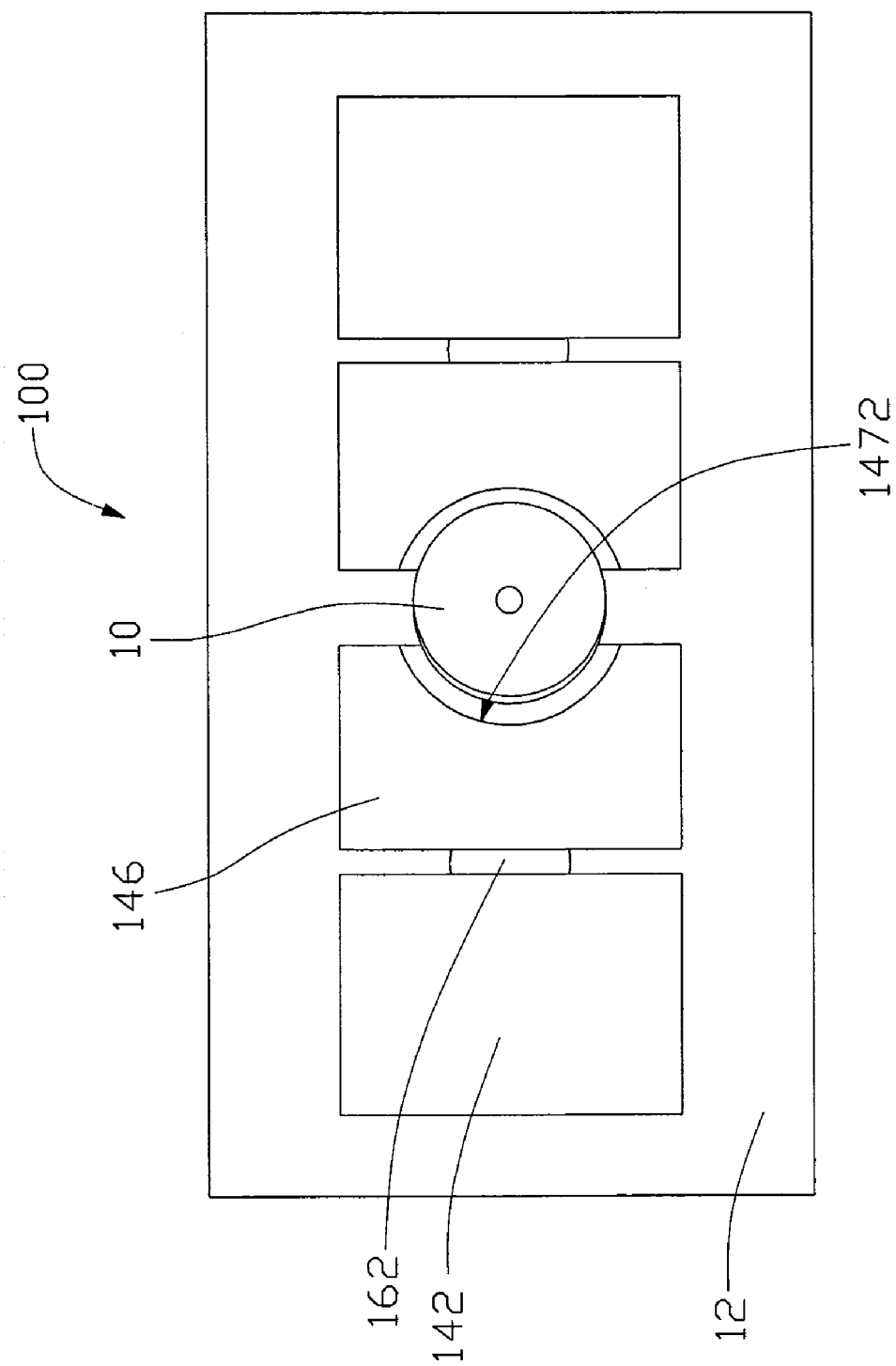
FIG. 2 is a top view of the apparatus in FIG. 1.
Figure 3:
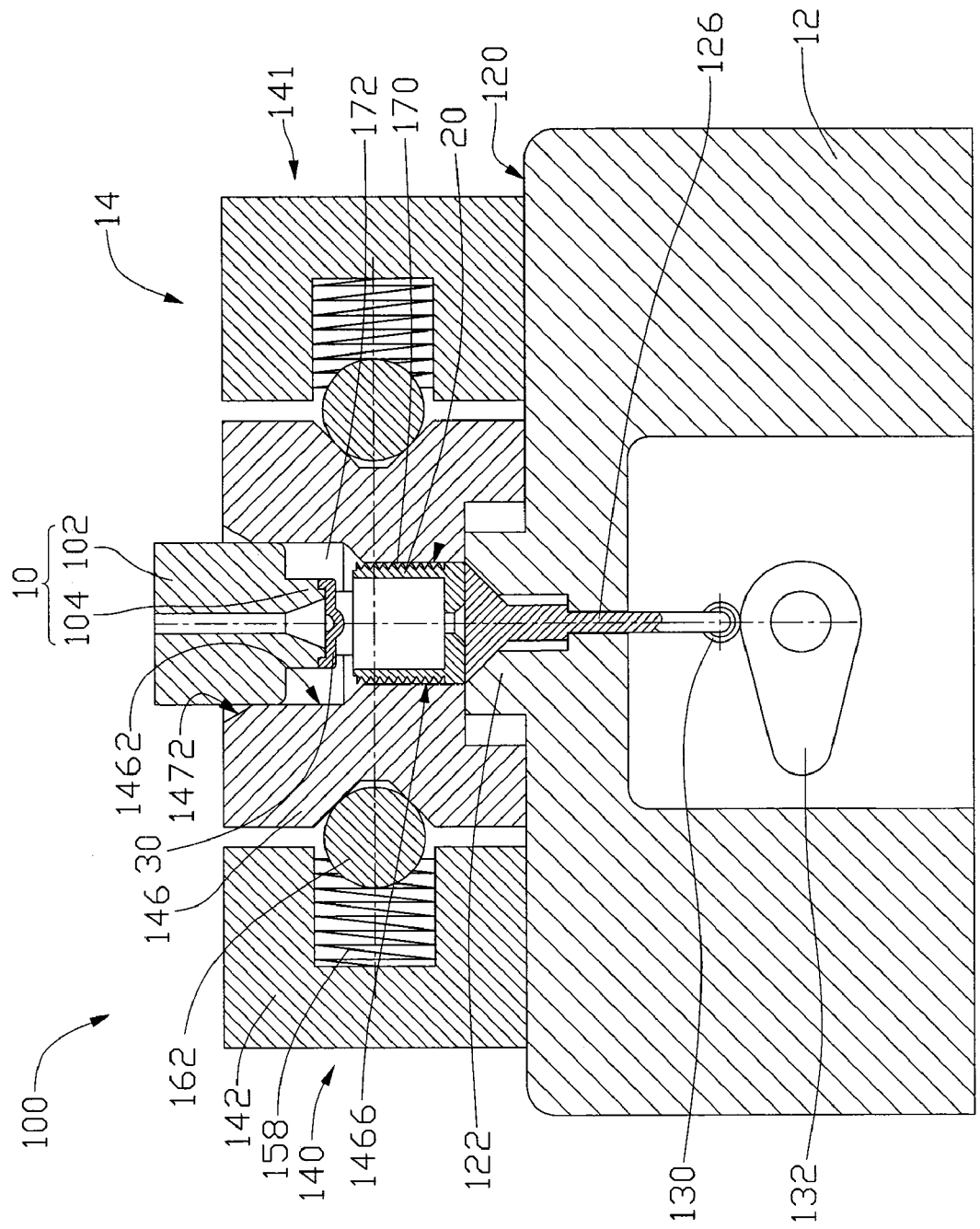
FIG. 3 is schematic, sectional view of the apparatus in FIG. 1 when an element-grasping member enters a guiding member of the apparatus.

Referring to FIGS. 2 and 3, the lens module is assembled by positioning the first guiding member half 140 and the second guiding member half 141 on the support surface 120. The lens barrel 20 is placed on the top surface of the protrusion stage 122. The clamping surfaces 1466 of the first and second guiding members 140, 141 tightly contact the outer surface of the lens barrel 20 so that the lens barrel 20 is clamped by the first and second guiding members 140, 141. The elastic elements 158 of the first and second guiding members 140, 141 are both in a compressed state and exert a force on the lens barrel 20.

The grasping body 104 of the element-grasping member 10 picks up the lens 30. The principal axis of the lens 30 is coaxial with the principal axis of the main body 102. The lens 30 is positioned over the guiding member 14 and the lens barrel 20. The element-grasping member 10 passes through the first receiving space 170 and the second receiving space 172, until the lens 30 is mounted in the lens barrel 20. Other optical elements 30, for example spacers and an IR-cut filter, are subsequently mounted in the lens barrel 20 thereby forming a lens module. The cam 132 is then turned to drive the lens module out of the second receiving space 172.

If the principal axis of the grasping body 104 is slightly offset with the principal axis of the lens barrel, then the movable elements 146 shift around the principal axis of the grasping body 104 until the principal axis of the lens barrel 20 is aligned with the principal axis of the grasping body 104. In other words, since the lens barrel 20 is clamped in the first receiving space, the movable elements 146 of the first and second guiding members 140, 141 move together until the main body 102 is received in the second receiving space 172. The elastic elements 158 of the first and second guiding members 140, 141 allow the movable elements 146 of the first and second guiding members 140, 141 to move freely.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An apparatus for assembling a lens module, the lens module comprising a lens barrel with a first principal axis and at least one optical element received therein, the apparatus comprising:
   an element-grasping member configured for grasping the at least one optical element and mounting the at least one optical element into the lens barrel, the element-grasping member having a second principal axis;
   an assembly station having a support surface; and
   two guiding members, each comprising:
      a stationary element fixedly positioned on the support surface;
      a movable element and an elastic element positioned between the stationary element and the movable element, the movable element comprising:
         a positioning surface configured for pressing the element-grasping member; and
         a clamping surface configured for pressing the lens barrel;
      wherein the two corresponding clamping surfaces of the two respective movable elements cooperatively define a first receiving space receiving the lens barrel, with the clamping surfaces contacting an outer surface of the lens barrel, and the two corresponding positioning surfaces of the two respective movable elements cooperatively define a second receiving space receiving the element-grasping member, with the positioning surfaces contacting an outer surface of the element-grasping member, such that the first principal axis of the lens barrel is aligned with the second principal axis of the element-grasping member.

2. The apparatus of claim 1, wherein the element-grasping member comprises a cylinder-shaped main body and a grasping body protruding from the main body for grasping the at least one optical element, the grasping body being coaxial with the main body, an external diameter of the main body being larger than that of the grasping body.

3. The apparatus of claim 2, wherein the positioning surface is U-shaped with a constant radius of curvature substantially equal to a radius of the outer surface of the main body of the element-grasping member.

4. The apparatus of claim 3, wherein the clamping surface is U-shaped with a constant radius of curvature substantially equal to a radius of the outer surface of the lens barrel.

5. The apparatus of claim 4, wherein a principal axis of the positioning surface and a principal axis of the clamping surface are substantially coaxial.

6. The apparatus of claim 1, wherein the movable element further comprises a guiding surface, the guiding surface being substantially half of a frustoconical shape and adjacent to the positioning surface, the guiding surface facing away from the support surface, and the guiding surface being capable of guiding the element-grasping member into the second receiving space between the positioning surfaces.

7. The apparatus of claim 1, wherein the movable element defines a blocking recess on a side surface facing towards the stationary element; one end of the elastic element being connected with the stationary element and an opposite end of the elastic element being connected with an urging element; the urging element touching an inner surface of the blocking recess.

8. The apparatus of claim 7, wherein a shape of the blocking recess is a frustum or a cone.

9. The apparatus of claim 7, wherein the stationary element defines a receiving recess on a side surface facing towards the blocking recess, the elastic element being received in the receiving recess.

10. The apparatus of claim 9, wherein a shape of the blocking recess is a frustum or a cone.

11. The apparatus of claim 1, wherein the assembly station defines a through hole; an eject-rod being received in the through hole; one end surface of the eject-rod being configured for supporting the lens barrel and an opposite end of the eject-rod being connected with the shaft portion of a rotatable wheel; the rotatable wheel operatively connected to a rotary cam; the rotary cam being driven to rotate so that the eject-rod moves along an extending direction of the through hole.

12. The apparatus of claim 1, wherein a circumferential angle of the positioning surface and the clamping surface is less than or equal to 180 degrees.

13. The apparatus of claim 1, wherein the elastic element is a compression spring or a single-leaf spring.

14. The apparatus of claim 1, wherein the clamping surface protrudes with respect to the positioning surface.

\* \* \* \* \*